Oct. 18, 1966

H. R. RAINGE 3,279,256

THERMAL MEASURING APPARATUS

Filed Dec. 27, 1963

INVENTOR.
HUGH R. RAINGE
BY
ATTORNEYS

INVENTOR.
HUGH R. RAINGE
BY
ATTORNEYS

Oct. 18, 1966 H. R. RAINGE 3,279,256
THERMAL MEASURING APPARATUS
Filed Dec. 27, 1963 3 Sheets-Sheet 3

INVENTOR.
HUGH R. RAINGE
BY
Russell, Chittick & Pfund
ATTORNEYS

United States Patent Office 3,279,256
Patented Oct. 18, 1966

1

3,279,256
THERMAL MEASURING APPARATUS
Hugh R. Rainge, Burlington, Mass., assignor to Rdf Corporation, Hudson, N.H., a corporation of Massachusetts
Filed Dec. 27, 1963, Ser. No. 333,949
9 Claims. (Cl. 73—342)

This invention relates to thermal measuring apparatus, and more particularly to an improved electrical device for measuring rapidly fluctuating thermal conditions.

Temperature transducers which produce an electrical output having a characteristic which varies in accordance with changes in temperature are well known in the temperature measuring art. Representative examples of electrical temperature transducers include such devices as, thermocouples, thermopiles, resistance thermometers and radiation pyrometers. The temperature sensitive electrical transducers respond to heat flow in the form of conduction, radiation or convection or a combination thereof depending upon the measurement environment, the particular characteristics of the measured substance e.g., fluid or solid, and the mode of operation of the transducer. For example, if an electrical transducer is positioned at some distance from the surface of the measurement body, the primary method of heat transfer is by radiation with some secondary convective heat flow. However, if the transducer is placed in contact with the body's measurement surface, conduction constitutes the primary method of heat transfer with little, if any, significant secondary radiational and/or convective heat flow.

In both modes of operation the electrical output of the transducer usually constitutes a voltage or current which varies in accordance with changes in the temperature of the measured body. Other methods of transducer instrumentation can be utilized to provide an electrical output in which temperature information is represented by fluctuations in phase and/or frequency if subsequent control circuits require input information in this form. However, regardless of the particular electrical characteristics of the transducer output, it is important to note that while the electrical output varies in accordance with the temperature of the measured body, the output is a measure only of the temperature of the transducer and not the temperature of the body.

Ideally, the instantaneous transducer temperature should be equivalent to the temperature of the measured body, however, under normal measurement conditions when the temperature of the body is fluctuating rapidly, the instantaneous transducer temperature and the body temperature are normally different because of an intervening thermal barrier between the transducer and the measured body. The thermal barrier or impedance introduces a temperature lag so that although the transducer temperature, and hence, transducer electrical output follows the fluctuations in body temperature, at any given instant the transducer temperature will correspond to the temperature of the measured body at a previous moment in time.

The thermal barrier temperature lag or error is a direct function of the temperature gradient in the thermal barrier i.e., the difference between the temperature of the measured body and the temperature of the transducer. Although the thermal barrier temperature gradient can be substantially eliminated if the transducer remains in a constant temperature environment for a sufficient period of time to reach thermal equilibrium, this procedure is rarely feasible because practical temperature measurements are seldom, if ever, made in an ideal measurement environment which permits the temperature transducer to reach the desired state of thermal equilibrium. Normally, temperature measurements are taken under non-ideal conditions of non-uniform and rapidly changing thermal conditions with heat flow to or from the measured body or environment and with little time for equilibrium conditions to be established. Under such measurement conditions, the thermal barrier temperature gradient introduces an error which is unacceptable in many industrial temperature measurement applications.

An accurate temperature measurement system can be achieved only if the influence of the thermal barrier error upon the measured temperature is eliminated completely. Although the inherent thermal barrier errors cannot be reduced to zero because of the inherent physical and thermal characteristics of the barrier material, the influence of these errors upon the measured temperature can be negated by utilizing the errors themselves to cancel out the effects of the thermal barrier.

Cancellation of the thermal barrier errors can be obtained by employing two transducers, hereinafter called "primary" and "secondary" transducers, which have dissimilar total thermal transfer coefficients. The term "total thermal transfer coefficient" will be defined subsequently, but in general refers to those factors which influence the transducer's response to a thermal condition. If the ratio of the transducer's total thermal transfer coefficients is the inverse of the ratio of their thermoelectric response sensitivities, then the differential combination of the transducer errors will produce a zero error, that is, a complete cancellation of the thermal barrier errors.

If the primary and secondary temperature transducers are instrumented to provide thermal barrier error cancellation, as hereinafter described, the combined transducers will also produce an apparent faster initial response to a step change in temperature than the individual response of either transducer to the same step change. The increase in apparent response time is desirable in most measurement situations because it permits an earlier approximation of the measured equilibrium temperature, however, it is obtained at a sacrifice of the total time required for the transducers to reach the equilibrium temperature. In other words, although the initial apparent response of the combined transducer instrumentation is faster than that of a single transducer, the total time required for the combined transducers to reach equilibrium temperature is considerably longer than that of a single transducer. The increase in total time to equilibrium temperature is caused by the combined electrical output of the transducers "overshooting" the one hundred percent figure of the equilibrium temperature and then slowly decaying back to the correct measured equilibrium temperature. It can be shown that the slope of the initial portion of the response curve for the combined primary and secondary transducers and the degree of "overshoot" are interrelated and that the amount of "overshoot" can be decreased only by slowing down the initial response and vice versa. It can also be shown that no single secondary transducer in combination with a primary transducer can produce both an increase in initial response time and a corresponding decrease in the amount of equilibrium temperature "overshoot."

It is accordingly the primary object of the present invention to provide a thermal barrier error cancellation instrumentation which increases the apparent initial response time of the transducers without producing a corresponding "overshoot" of the equilibrium temperature.

It is another object of the invention to provide a simple and inexpensive means for changing the response characteristics of the thermal barrier error cancellation instrumentation in accordance with the above-mentioned primary object.

These and other objects and features of the invention will best be understood from a more detailed description of the preferred embodiments thereof, selected for purposes of illustration, and shown in the accompanying drawings, in which.

Figure 1:
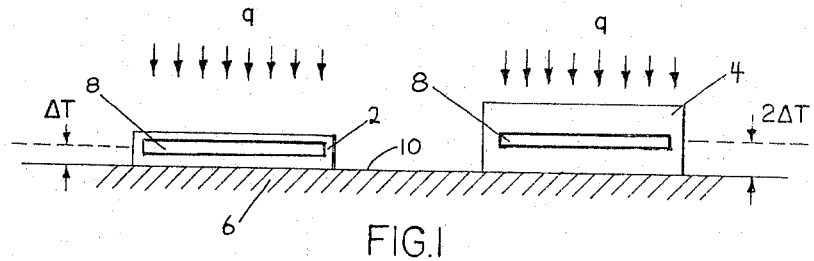
FIG. 1 is a simplified diagram showing in cross section two transducer units with their associated thermal impedances and corresponding temperature errors.

Turning now to the drawings, the general principle of thermal barrier error cancellation is illustrated in FIG. 1 wherein two temperature transducers or sensors 2 and 4 are presented to and in thermal contact with an object 6. The temperature sensors 2 and 4, hereinafer called "primary" and "secondary" sensors, each have a transducer element 8 mounted there in to convert temperature to an electrical output having a characteristic which varies in accordance with changes in temperature. The particular type of transducer element is not important for purposes of a general discussion of the thermal barrier error cancellation instrumentation because the instrumentation can be accomplished with any one of the well known transducer elements such as resistance wire thermometers and thermocouples.

Assuming, for purposes of illustration, that the primary and secondary sensors 2 and 4 each have a thermocouple transducer element 8, then the output from the transducer will be an electromotive force, the magnitude of which is a function of the temperature of the transducer element. The temperature of the transducer element 8 will vary from the true temperature of the object measurement surface 10 by an amount corresponding to the thermal gradient between the object surface 10 and the transducer element 8. The thermal gradient occurs because the total thermal transfer coefficient between the measurement surface 10 and the transducer element 8 differs from unity. The term "total thermal transfer coefficient" is defined as including all factors which influence the ability of the transducer element 8 to respond instantaneously to a given temperature condition. Ideally, the instantaneous temperature of the transducer element 8 should be identical to the true temperature of the measurement surface 10, but this goal is impossible to obtain because of the intervening thermal barrier and associated temperature gradient.

In the case of "contact" type transducers e.g., intimately bonded resistance thermometers and directly welded thermocouples, the total thermal transfer coefficient differs from unity primarily as a result of the intervening thermal barrier i.e., the thermal impedance between the measurement surface 10 and the transducer element 8. Radiational and/or convectional heat losses will have little, if any, significant influence upon the total thermal transfer coefficient of the "contact" type transducers. However, since the radiational and/or convectional losses may strongly affect the transfer coefficient in other measurement situations, the term "total thermal transfer coefficient" will be employed in the following discussion although it should be understood that in the case of "contact" transducers, the total thermal transfer coefficient is substantially affected only by the intervening thermal impedance.

Referring now to FIG. 1 and assuming that the primary transducer or sensor 2 has a given thermal impedance between the transducer element 8 and the measurement surface 10, and further, that a given quantity of heat energy $q$ impinges upon the sensor, then the instantaneous temperature of the transducer element 8 will be higher than the surface temperature of the object 6 due to the intervening thermal impedance. If the instantaneous object surface temperature is T, then the temperature of the transducer element 8 will be $T+\Delta T$ where $\Delta T$ represents the temperature error in degrees.

Now consider the secondary sensor 4 which has by design a thermal impedance two times greater than the thermal impedance of the primary sensor 2. It is apparent that the temperature of the secondary sensor transducer element will be $T+2\Delta T$. If $e$ represents the correct electrical output corresponding to the true surface temperature T, then the actual output from the secondary sensor 4 will be $a+2\Delta e$. Assuming that the transducer element of the primary sensor 2 has twice the thermoelectric response sensitivity of the secondary sensor transducer element, then the electrical output from the primary sensor 2 will be $2e+\Delta e$. If the outputs are combined differentially, the result is $e$ where $2e+\Delta e-e-2\Delta e=e$. Since $e$ represents the correct electrical output for the true temperature T, it can be seen that the errors introduced by the thermal impedances between the transducer elements 8 and the measurement surface 10 have been effectively cancelled.

The relationship between the total thermal transfer coefficient and the thermoelectric response sensitivity of the transducer element can be expressed as one in which the thermoelectric response sensitivities of the respective sensors are related in substantially the inverse ratio of their total thermal transfer coefficients. Thus, if the primary sensor 2 had twice the thermal impedance of the secondary sensor 4, the thermoelectric response sensitivity of the secondary sensor 4 would have to be twice that of the primary sensor 2.

Figure 2:
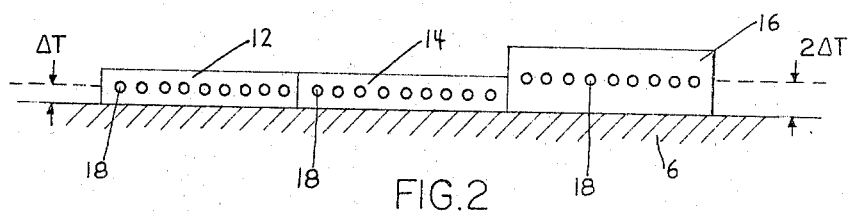
FIG. 2 is a simplified diagram in cross section showing a multi-element transducer assembly adapted for use in a four-arm direct-reading galvanometer type bridge circuit.

Although it was assumed in the above discussion that both the primary and secondary transducer elements 8 were thermocouples, other types of transduced elements can also be employed to obtain cancellation of the thermal barrier errors. For example, resistance type thermometers are employed in the instrumentation depicted in FIGS. 2 and 3 wherein resistance sensors 12, 14 and 16 are presented to and in thermal contact with the measurement surface 10 of object 6. Each of the sensors has a resistance wire grid 18, the resistance of which varies in accordance with changes in temperature. Sensors 12 and 14 have a given and identical thermal impedance between the resistance wire grid 18 and the measurement surface 10 of object 6. These two sensors correspond to the primary sensor 2 in the above discussion and, therefore, will also be termed "primary" sensors. Sensor 16 i.e., the "secondary" sensor in this particular configuration is designed to have twice the thermal impedance of one of the primary sensors 12 or 14.

If the instantaneous object surface temperature is T, then the temperature of the resistance wire grid 18 of primary sensor 12 will be $T+\Delta T$ where $\Delta T$ represents the temperature error in degrees. Since the primary sensor 14 has the same thermal impedance as primary sensor 12, it follows that the temperature of the resistance wire grid 18 of sensor 14 will also be $T+\Delta T$. If R represents the correct sensor resistance corresponding to the true surface temperature T, then the actual sensor resistance of the primary sensors 12 and 14 will be $R+\Delta R$ where $\Delta R$ in ohms corresponds to $\Delta T$ in degrees. Since the secondary sensor 16 has twice the thermal impedance of the primary sensors, the temperature of the resistance wire grid 18 of the secondary sensor 16 will be $T+2\Delta T$ which can be expressed in terms of resistance as $R+2\Delta R$.

Figure 3:
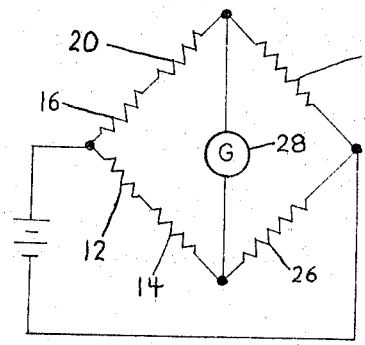
FIG. 3 is a schematic diagram of such a bridge circuit.

Referring to FIG. 3, secondary sensor 16 and a fixed resistor 20 are series connected to form one arm of a four arm bridge circuit indicated generally as 22. The second arm of the bridge circuit 22 consists of a fixed resistor 24. The third bridge arm consists of the two primary sensors 12 and 14 in series connection and the fourth arm consists of a resistor 26. Resistors 24 and 26 constitute the ratio arms of the bridge circuit 22 and both resistors have a zero temperature coefficient i.e., the resistance is independent of temperature. The fixed first arm resistor 20 also has a zero temperature coefficient.

The bridge circuit 22 combines the resistances of sensors 12, 14 and 16 so that the voltage across and, hence, current through galvanometer 28 proportional to the resistance of sensor 12 plus the resistance of sensor 14 minus the resistance of sensor 16. The current through galvanometer 28 will thus be a function.

$$\frac{(R+\Delta R) + (R+\Delta R) - (R+2\Delta R)}{R+\Delta R + R+\Delta R - R+2\Delta R} = R$$

Since R is defined as the resistance of a single sensor at temperature T, the true temperature of surface 10, the current through galvanometer 28 is a function of the true surface temperature T, and the thermal barrier errors have been effectively cancelled.

Other bridge circuit configurations of course can be employed to instrument the primary and secondary sensors to provide thermal barrier error cancellation. For example, if the primary sensors 12 and 14 and the secondary sensor 16 are connected in accordance with the bridge circuit 22 shown in FIG. 3, the two primary sensors 12 and 14 can be combined into a single sensor 30 as shown in FIG. 4.

Figure 4:
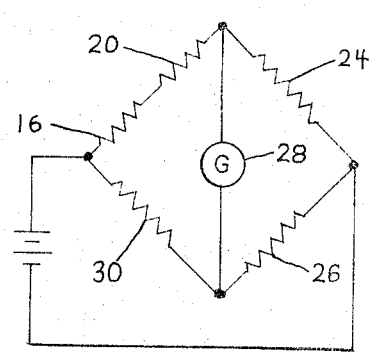
FIG. 4 is a schematic diagram of an alternative embodiment of the direct-reading galvanometer type bridge circuit for use with the multi-element transducer assembly shown in FIG. 2.

While the primary and secondary sensor instrumentation depicted in FIGS. 3 and 4 effectively cancels the thermal barrier errors, it also produces a concomitant effect which may or may not be beneficial depending upon the desired performance characteristics of the measurement system. As mentioned previously, the thermal barrier error cancellation instrumentation provides an increase in the apparent initial response of the combined sensors albeit at a cost of increasing the total time required for the sensors to reach equilibrium temperature.

This side effect of the primary and secondary sensor instrumentation can best be explained by starting with the classical exponential response curve of an idealized sensor. Since the derivation of the exponential response equation is given in many of the well known standard texts on temperature measurement, no detailed explanation of the exponential response equation is necessary for an understanding of the following discussion of sensor response curves. For the purposes of this discussion, the exponential response equation may be expressed as $$(T_i - T_o) = (T - T_o)\left(1 - e^{\frac{-t}{\tau}}\right)$$

where $T_o$ and T are the initial and final values, respectively, of a step function temperature change that is the forcing function for the sensor. $T_i$ is the temperature indicated by the sensor at any time $t$, and $\tau$ is the "time constant" of the sensor. $\tau$ is a property of the sensor which depends upon the sensor's thermal capacity, thermal conductivity and other thermal characteristics which establish the response rate of the sensor and the total time required for the sensor to reach the new equilibrium temperature T.

From an inspection of the above exponential response equation, it will be apparent that if $\tau=1$ and $t=\tau$, then the value of the term $(T_i-T_o)$ is .63212 $(T-T_o)$. In other words whenever $t=\tau$, the sensor response will be 63.2% of the new equilibrium temperature T. The time required to reach 63.2% of a step function change, described variously as the "characteristic time," "time constant," etc., is useful in describing exponential response characteristics. For instance, if the time constant is known, it is then possible to predict when the sensor will reach any given percent response, such as 86.5% in $\tau$, 95% in $3\times\tau$, and 99.3% in $5\times\tau$.

It should be remembered that only an idealized sensor will display an exponential response curve to a step change in temperature. In practice all temperature sensors have a start-up lag time caused by the fact that a finite time is required for the temperature change pulse to reach the sensing element. The amount of start-up lag time is a function primarily of the sensor construction and the thermal characteristics of the materials used in the sensor. As a result of the sart-up lag time, an actual sensor response curve will start slowly and then curve upwardly instead of starting instantaneously with an initial slope as is the case with the exponential curve of the idealized sensor. The differences between the exponential response curve of an idealized sensor and the response curve of an actual sensor are depicted in FIG. 5 wherein the abscissa and the ordinate represent time $t$ and temperature T, respectively.

Figure 5:
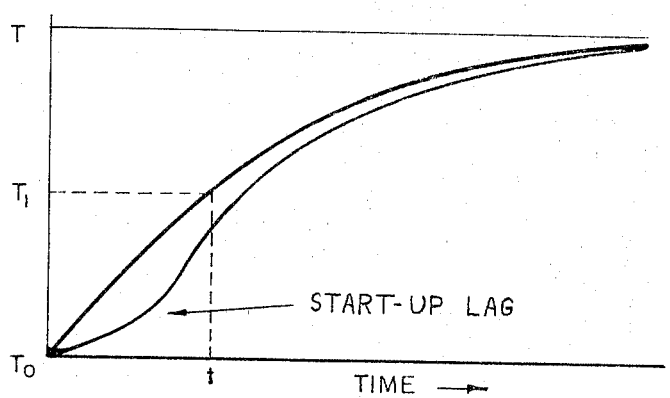
FIG. 5 is a graph illustrating the expediential response curve of an idealized temperature transducer and the response curve of an actual transducer.

In addition to the start-up lag time illustrated in FIG. 5, other minor distortions will also appear in the actual response curves for non-idealized single sensors. It is important to note that all of the single sensor response curve distortions, including the start-up lag time, are in the direction of slowing down the response of the actual sensor compared to that of an idealized sensor. Nothing can be done to a single sensor that will provide an actual response that is faster than the ideal response for a particular sensor design and test condition. By way of contrast, however, the above described thermal barrier error cancellation instrumentation of the primary and secondary sensors does provide an apparent response that is faster than the ideal response of a single sensor and, as mentioned previously, the combined response of the primary and secondary sensors is faster than the individual response of either the primary or secondary sensors.

In order to determine the theoretical response characteristics of the primary and secondary sensors, it is desirable to assume that each sensor has an ideal exponential response to a step change in temperature. For example, assume the following: first, that the primary sensors 12 and 14 and the secondary sensor 16 each have the same basic resistance value and temperature coefficient of resistance (this is not essential to the thermal barrier error cancellation instrumentation, but is convenient for analysis purposes); second, that the primary sensors 12 and 14 have identical response times i.e., the same thermocoupling to the surface 10; and, third, that the secondary sensor 16 has a slower response than the primary sensors as a result of a different thermal impedance or coupling between the secondary sensor 16 and the object surface 10. If the temperature of the surface 10 is changed instantaneously, the response of the sensor may be expressed as $$\Delta R = K\left(1 - e^{\frac{-t}{\tau}}\right)$$

where $\Delta R$ is the change in resistance and K is a constant depending upon resistance, temperature coefficient, temperature step change, etc. For analysis purposes it is only necessary to consider the variable part of the expression $$\left(1-e^{-\frac{t}{\tau}}\right)$$

Figure 6:
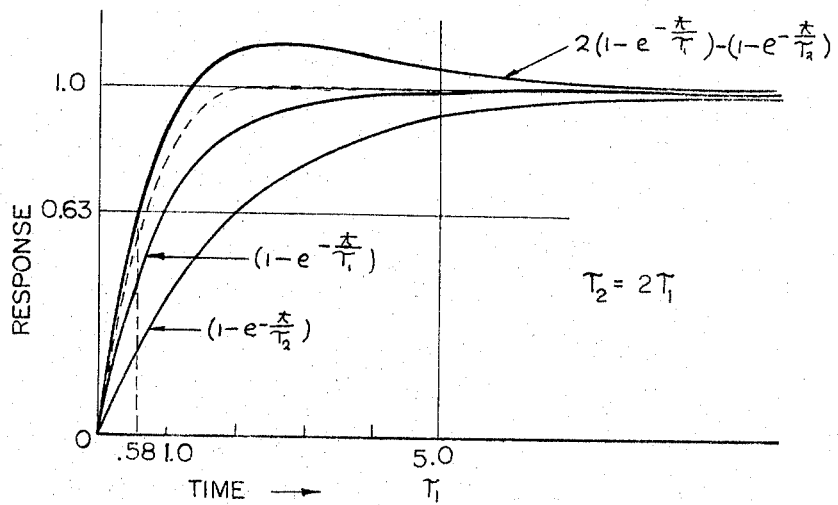
FIG. 6 is a graph illustrating individual and combined response curves for primary and secondary temperature transducers having a known relationship.
Figure 7:
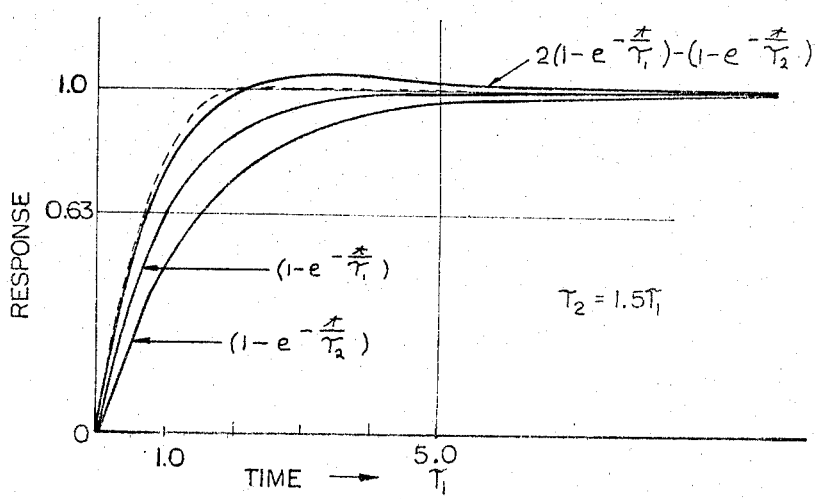
FIG. 7 is a similar graph illustrating the individual and combined response curves for primary and secondary transducers having a different known relationship.
Figure 8:
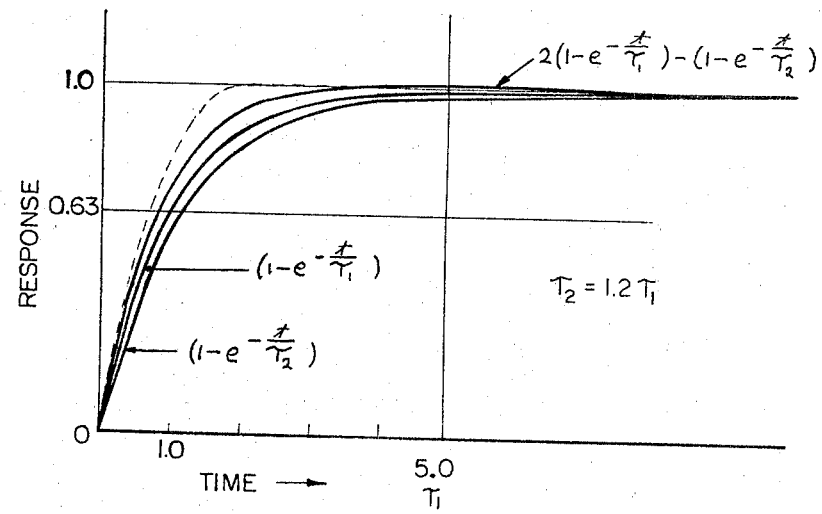
FIG. 8 is another graph illustrating the individual and combined response characteristics of primary and secondary transducers having a still different known relationship.

The output or response of the primary sensors 12 and 14 is therefore proportional to $$\left(1-e^{-\frac{t}{\tau_1}}\right)$$

while the output or response of the secondary sensor 16 is proportional to $$\left(1-e^{-\frac{t}{\tau_2}}\right)$$

where $\tau_1$ and $\tau_2$ are the respective time constants of the primary and secondary sensors. If certain bridge nonlinearities, such as those introduced by large resistance changes, are neglected, the combined response of the primary and secondary sensors to a step change in temperature is equal to $$2\left(1-e^{-\frac{t}{\tau_1}}\right)-\left(1-e^{-\frac{t}{\tau_2}}\right)$$

when the sensors are instrumented to provide cancellation of the thermal barrier errors, e.g., the bridge circuit of either FIG. 3 or FIG. 4. FIGS. 6, 7 and 8 show curves of the functions $$\left(1-e^{-\frac{t}{\tau_1}}\right), \left(1-e^{-\frac{t}{\tau_2}}\right) \text{ and } 2\left(1-e^{-\frac{t}{\tau_1}}\right)-\left(1-e^{-\frac{t}{\tau_2}}\right)$$

for $\tau_2=2\tau_1$, $\tau_2=1.5\tau_1$, and $\tau_2=1.2\tau_1$, respectively.

Referring to FIG. 6 wherein the secondary sensor 16 has twice the response time of the primary sensor i.e., $\tau_2=2\tau_1$, it can be seen that the response curve of the combined primary and secondary sensors reaches the 63.2% level in approximately 58% of the time required for an individual primary sensor. It is apparent that a substantial improvement has been made in the time constant. However, the combined response curve does not stop at the new equilibrium temperature i.e., 100%, but continues beyond and peaks at approximately 112% and then decays slowly back to the equilibrium temperature.

The "overshoot" of the combined primary and secondary sensor instrumentation can be reduced by shortening the response time of the secondary sensor relative to the primary sensor as shown in FIG. 7 where $\tau_2=1.5\tau_1$. Here the "overshoot" has been reduced to approximately 3½%, but there has also been a corresponding increase in the time required to reach the 63.2% level. In other words, the 63.2% level occurs now at approximately 69% of $\tau_1$.

In FIG. 8 the response time of the secondary sensor has been increased so that $\tau_2=1.2\tau_1$ with the result that the "overshoot" has been reduced to practically zero. However, the time required to reach the 63.2% level has been increased significantly to 84% of $\tau_1$.

The series of curves depicted in FIGS. 6, 7 and 8 demonstrate that as the "overshoot" of the combined primary and secondary sensors is reduced to zero (FIG. 8), the relative advantage of the combined sensor instrumentation is also reduced. Thus when the "overshoot" has been reduced to zero, there is only a 15% speed-up in the conventional 63.2% response. This is not a particularly significant improvement although it should be noted that the 99.5% response has been improved by approximately 30%.

Ideally, the response should duplicate the step function temperature change i.e., the response curve should reach 100% in the shortest possible time without any trace of "overshoot." Unfortunately, such a response is unobtainable in the present measurement art. However, the closer the sensor response duplicates the forcing function the better the sensor is from the standpoint of measuring rapidly changing thermal conditions.

From an inspection of the series of curves depicted in FIGS. 6, 7 and 8, it is apparent that although no individual sensor response curve approaches the desired response curve, the desired response curve can be created by combining selected portions of the various response curves shown therein. The first portion of the manufactured response curve i.e., until the response approaches 100%, should duplicate the response curve of the combined primary and secondary sensors $$\left[2\left(1-e^{-\frac{t}{\tau_1}}\right)-\left(1-e^{-\frac{t}{\tau_2}}\right)\right]$$

depicted in FIG. 6, while the latter portion of the response curve should duplicate the combined primary and secondary sensor response curves shown in FIGS. 7 and 8. In other words, the desired curve will be produced where $\tau_2=2\tau_1$ for the first portion of the curve and $\tau_2=1.5\tau_1$ for the latter portion of the curve.

Since the desired response curve is predicated upon a secondary sensor having a variable time constant $\tau_2$ which changes from greater than or equal to twice $\tau_1$ to less than $1.5\tau_1$ during the sensor's excursion from initial to equilibrium temperature, it is apparent that no single secondary sensor can display the requisite variable time constant characteristic. However, if another sensor is connected in parallel with the secondary sensor, the joint response from the two sensors when combined with the response from the primary sensor will produce a response curve which fulfills the principal object of the present invention i.e., an increase in the apparent initial response without a corresponding "overshoot" of the equilibrium temperature. The response curve for this particular sensor configuration is shown by the dotted line in FIGS. 6, 7 and 8 and will be discussed subsequently with respect to each individual figure after the following analysis of the required sensor instrumentation.

Figure 9:
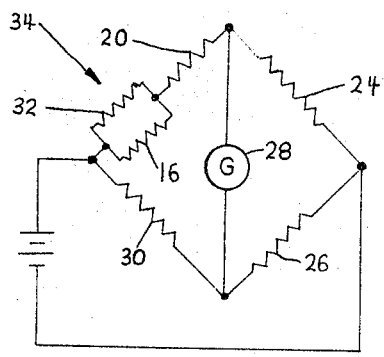
FIG. 9 is a schematic diagram of a preferred embodiment of the invention.

Referring to FIG. 9, the bridge circuit shown therein is the same as the bridge circuit depicted in FIG. 4 with the exception of the secondary sensor 16. As shown in FIG. 9, the secondary sensor 16 is shunted by a temperature sensitive compensating sensor 32. The secondary and compensating sensors 16 and 32, respectively, are collectively termed a "composite secondary sensor," indicated generally as 34 in FIG. 9.

In order to utilize the thermal barrier error cancellation instrumentation described previously, the composite secondary sensor 34 must have an electrical response sensitivity to temperature which is related to the primary sensor's electrical response sensitivity to temperature as the inverse of the ratio of their respective total thermal transfer coefficients. For example, if the electrical response sensitivity of the composite secondary sensor 34 is twice that of the primary sensor 30, then the total thermal transfer coefficient of the composite secondary sensor 34 must be one-half of the primary sensor's total thermal transfer coefficient. However, to achieve the principal object of this invention, the composite secondary sensor must also have a variable time constant i.e., an apparent changing total thermal transfer coefficient, during the sensor's excursion from the initial temperature to the final temperature of the equilibrium condition.

These two requirements for the composite secondary sensor 34 are not mutually exclusive because the former requirement of inverse ratios of electrical response sensitivities and total thermal transfer coefficients is applicable only to the static conditions of initial and equilibrium temperatures whereas the changing time constant requirement refers to a dynamic characteristic of the sensor during temperature changes.

The time constant or apparent total thermal transfer coefficient of the composite secondary sensor 34 can be made variable during sensor excursion by changing one or more of the fixed characteristics of the secondary sensor 16 and the paralleled compensating sensor 32 relative to each other or by changing the ratio arms of the bridge circuit. Included in the former category are such characteristics as the relative resistances, temperature coefficients and sensor locations while the later category refers specifically to changing the resistance values of the bridge ratio arms. If the resistances of the secondary and compensating sensors are equal, they can be unbalanced or the materials of the two sensors can be altered so that the sensors will have different temperature coefficients of resistance and, finally, the respective locations of the two sensors can be adjusted so that one sensor will feel the heat pulse before the other.

Figure 10:
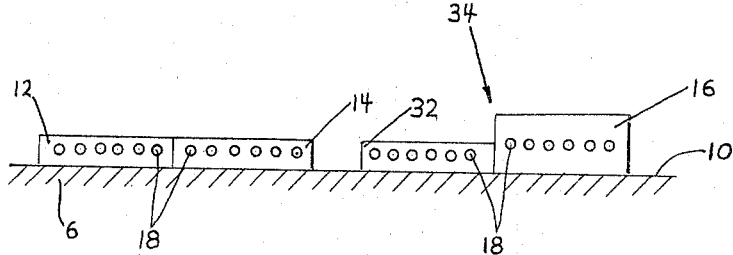
FIG. 10 is a simplified diagram showing in cross section the transducer units depicted schematically in FIG. 9.

If the relative locations of the secondary and compensating sensors are varied, it is apparent that their respective total thermal transfer coefficients will also be varied accordingly. In the case of "contact" type transducers this essentially means varying the respective thermal impedances of the two sensors. One method of varying the relative thermal impedances of the secondary and compensating sensors is shown in FIG. 10 wherein the split primary sensors 12 and 14 and the secondary sensor 16 are identical to those depicted in FIG. 2 and instrumented in FIG. 3. In addition to the three sensors just mentioned, a compensating sensor 32 having the same thermal impedance and electrical characteristics of the primary sensors 12 and 14 is positioned in contact with the measurement surface 10 of object 6. Since the compensating sensor 32 has one-half the thermal impedance of the secondary sensor 16, it can be seen that the heat pulse will strike the compensating sensor 32 causing a resistance change therein before it influences the secondary sensor 16. Thus, even though the secondary and compensating sensors may have the same resistances and therefore a given parallel resistance for static temperature conditions, the value of the combined parallel resistances will be a changing quantity because the two sensors are reacting to the same heat pulse, but at different times.

The changing value of the composite secondary sensor's parallel resistance during excursion from initial to equilibrium temperature upsets the above-mentioned inverse ratio of electrical response sensitivities to total thermal transfer coefficients because the composite sensor's electrical response sensitivity varies in accordance with the changes in its parallel resistance. Although the change in electrical response sensitivity of the composite secondary sensor 34 is an electrical effect, it produces an apparent change in the thermal impedance of the composite sensor. In other words, the composite secondary sensor 34 behaves as though it were a single secondary sensor which had a varying thermal impedance and, this of course, is exactly the behavior characteristic which is required to produce the desired sensor response curve.

It should be noted at this point that while the composite secondary sensor's electrical response sensitivity is a variable quantity, the electrical response sensitivity and, hence, the apparent thermal impedance of the composite sensor, vary only during the sensor's excursion from initial to equilibrium temperature. At the static conditions of initial and equilibrium temperatures, the electrical response sensitivity of the composite secondary sensor 34 is fixed and has a value which meets the inverse ratio requirement described above.

Referring again to FIG. 10, the relative locations of the compensating sensor 32 and secondary sensor 16 shown therein is merely illustrative of one possible sensor arrangement and other relative locations can be employed without departing from the scope of the invention. For instance, the secondary sensor 16 can be superposed on the compensating sensor 32 with a corresponding change in the thermal impedance of the secondary sensor 16 and the dynamic parallel resistance of the composite sensor 34. By such adjustments in sensor location and other adjustments relating to the relative sensor static resistances and temperature coefficients, it is possible to distort, that is, emphasize certain portions of the combined primary and composite secondary response curve as required by the particular measurement situation.

Furthermore, it will be readily understood that the split primary sensors 12 and 14 can be combined into a single primary sensor 30 and instrumented in accordance with the bridge circuit depicted in FIG. 9. Moreover, other bridge circuits may also be employed to instrument the primary and composite secondary sensors to provide thermal barrier error cancellation and an increased apparent initial response without a corresponding "overshoot" of the equilibrium temperature. For example, if the split primary sensors are used, as shown in FIG. 10, the primary sensors may be placed in separate arms of the FIG. 9 bridge circuit by substituting the primary sensors resistances 12 and 14 for the resistances 24 and 30.

However, regardless of which particular circuit configuration is employed to instrument the primary and composite secondary sensors, the combined response thereof can be controlled by proper selection of the secondary and compensating sensor parameters to produce the desired response curve or any modification thereof.

The desired combined sensor response curve is shown in FIGS. 6, 7 and 8 by a dotted line. It can be seen from an inspection of FIG. 6 that although the combined primary and composite secondary sensor response is slightly slower than the combined response of a primary sensor and a single secondary sensor, there is no objectionable "overshoot" of the equilibrium temperature. With respect to FIG. 7, the response is not only faster than the combined primary-single secondary sensor response, but there is also no corresponding "overshoot" of the 100% value. In FIG. 8, the relative advantages of the composite secondary sensor arrangement over the single secondary sensor configuration are quite apparent. The composite secondary sensor arrangement produces a significantly faster response to the equilibrium temperature without causing any "overshoot" of the equilibrium temperature.

Numerous other variations of the invention will now be readily apparent to those skilled in the art, and therefore, it is not my intention to limit the same to the precise form of the embodiments shown herein, but rather to limit it in terms of the appended claims.

Having thus described and disclosed preferred embodiments of my invention, what I claim as new and desire to secure by Letters Patent of the United States is:

1. Thermal measuring apparatus comprising: primary and secondary temperature sensitive electrical transducer devices having respectively different electrical response sensitivities to temperature, and having total thermal transfer coefficients the ratio of which is substantially the inverse of the ratio of their respective electrical response sensitivities; means for presenting said transducer devices to the same temperature condition to be measured; electrical means coupled to said transducer devices for detecting the difference of the responses thereof; and means for selectively altering the electrical response characteristics of at least one of said transducer devices to changes in thermal conditions.

2. The apparatus defined in claim 1 wherein said means for selectively altering the electrical response characteristics of at least one of said transducer devices comprises: a temperature sensitive electrical transducer device connected in parallel with said response altered transducer device.

3. Thermal measuring apparatus comprising: a primary temperature sensitive resistance means and a composite secondary temperature sensitive resistance means having respectively different electrical response sensitivities to temperature, and having total thermal transfer coefficients the ratio of which is substantially the inverse of the ratio of their respective electrical response sensitivities; means for presenting said temperature sensitive resistance means to the same temperature condition to be measured; and electrical means coupled to said resistance means for detecting the difference of the responses thereof.

4. Thermal measuring apparatus comprising: a primary temperature sensitive resistance means and a composite secondary temperature sensitive resistance means having respectively different electrical response sensitivities to temperature, and having total thermal transfer coefficients the ratio of which is substantially the inverse of the ratio of their respective electrical response sensitivities, said composite secondary resistance means comprising: a secondary temperature sensitive resistance means and a compensating temperature sensitive resistance means connected in parallel with said secondary resistance means; means for presenting said primary resistance means and said composite secondary resistance means to the same temperature condition to be measured; and electrical means coupled to said primary resistance means and said composite secondary resistance means for detecting the difference of the responses thereof.

5. The apparatus defined in claim 4 wherein said electrical means comprises: a bridge circuit having four arms, said first arm comprising a zero temperature coefficient fixed resistor in series connection with said paralleled secondary and compensating resistance means, said second arm comprising a zero temperature coefficient fixed resistor, said third arm comprising said primary resistance means and said fourth arm comprising a zero temperature coefficient fixed resistor.

6. The apparatus defined in claim 4 wherein said electrical means comprises: a bridge circuit having four arms, with said paralleled secondary and compensating resistance means included in one arm, said primary resistance means included partly in a second arm and partly in a third arm and a fixed zero temperature coefficient resistance included in said fourth arm of the bridge circuit.

7. The apparatus defined in claim 4 further characterized by said secondary and compensating resistance means having respectively different resistances.

8. The apparatus defined in claim 4 further characterized by said secondary and compensating resistance means having respectively different temperature coefficients of resistance.

9. The apparatus defined in claim 4 further characterized by said secondary and compensating resistance means having respectively different total thermal transfer coefficients.

References Cited by the Examiner

UNITED STATES PATENTS 2,798,377  7/1957  Brownlee et al. _____ 73—340

LOUIS R. PRINCE, *Primary Examiner.*

UNITED STATES PATENT OFFICE
CERTIFICATE OF CORRECTION

Patent No. 3,279,256                                                      October 18, 1966

Hugh R. Rainge

It is hereby certified that error appears in the above numbered patent requiring correction and that the said Letters Patent should read as corrected below.

Column 3, line 42, for "there in" read -- therein --; column 4, line 37, for "2e+∆e—e—2∆e=e" read -- 2e+2∆e—e—2∆e=e --; line 55, for "transduced" read -- transducer --; column 5, line 18, after "consists of a" insert -- fixed --; line 31, for "R+∆R+R+∆R-R+2∆R=R" read -- R+∆R+R+∆R-R-2∆R=R --; column 6, line 23, for "sart-up" read -- start-up --.

Signed and sealed this 5th day of September 1967.

(SEAL)
Attest:

ERNEST W. SWIDER                                                     EDWARD J. BRENNER
Attesting Officer                                                           Commissioner of Patents